United States Patent
Ylitalo et al.

(10) Patent No.: US 6,671,499 B1
(45) Date of Patent: Dec. 30, 2003

(54) METHOD FOR DIRECTING ANTENNA BEAM, AND TRANSCEIVER IN A MOBILE COMMUNICATION SYSTEM

(75) Inventors: Juha Ylitalo, Oulu (FI); Marcos Katz, Oulu (FI)

(73) Assignee: Nokia Corporation, Espoo (FI)

( * ) Notice: Subject to any disclaimer, the term of this patent is extended or adjusted under 35 U.S.C. 154(b) by 583 days.

(21) Appl. No.: 09/609,339

(22) Filed: Jul. 5, 2000

Related U.S. Application Data

(63) Continuation of application No. PCT/FI98/00818, filed on Oct. 20, 1998.

(30) Foreign Application Priority Data

Jan. 9, 1998 (FI) .................................................. 980035

(51) Int. Cl.$^7$ .............................. H04B 7/02; H04L 27/04
(52) U.S. Cl. .................... 455/101; 455/562.1; 455/133; 455/506; 375/299
(58) Field of Search ................................ 455/101, 102, 455/103, 104, 105, 115.1–115.4, 68, 69, 561, 562.1, 506, 504, 65, 227, 63.4; 375/299; 370/252, 334, 491, 335; 342/359, 367, 375, 157

(56) References Cited

U.S. PATENT DOCUMENTS

| | | | |
|---|---|---|---|
| 4,404,563 A | | 9/1983 | Richardson |
| 5,303,240 A | | 4/1994 | Borras et al. |
| 5,548,808 A | * | 8/1996 | Bruckert et al. ............. 455/436 |
| 5,648,968 A | | 7/1997 | Reudink |
| 5,809,019 A | * | 9/1998 | Ichihara et al. ............. 370/334 |
| 5,970,061 A | * | 10/1999 | Kokudo ..................... 370/344 |
| 6,006,075 A | * | 12/1999 | Smith et al. ................. 455/101 |
| 6,167,286 A | * | 12/2000 | Ward et al. ............... 455/562.1 |
| 6,275,482 B1 | * | 8/2001 | Jevremovic et al. ........ 370/334 |
| 6,396,821 B1 | * | 5/2002 | Takahashi ................... 370/335 |

FOREIGN PATENT DOCUMENTS

| | | |
|---|---|---|
| WO | WO 96/37975 | 11/1996 |
| WO | WO 97/17770 | 5/1997 |

OTHER PUBLICATIONS

International Search Report for PCT/FI98/00818.

* cited by examiner

*Primary Examiner*—Duc M. Nguyen
(74) *Attorney, Agent, or Firm*—Squire, Sanders & Dempsey L.L.P.

(57) ABSTRACT

A method for directing an antenna beam, and a transceiver which comprises antenna arrays forming antenna beams in the transmission direction, by means of which beams a signal is transmitted, and which receives signals that propagate via different paths to the transceiver. The transceiver comprises estimating means for estimating directions of arrival of the received signals, when the transceiver receives signals propagated via different paths, measuring means for measuring the strengths of the signals received from different paths of arrival, and beam directing means. The directing means command the antenna array to form in the transmission direction the main antenna beam which is formed in the direction wherefrom the strongest signal is received, if the directions of arrival of the received signals differ only slightly from one another. If the directions of arrival of the received signals differ greatly from one another, the directing means command the antenna array to form, in addition to the main beam, one or more diversity beams, which are formed in the direction, wherefrom a signal exceeding the predetermined threshold value is received.

27 Claims, 3 Drawing Sheets

METHOD FOR DIRECTING ANTENNA BEAM, AND TRANSCEIVER IN A MOBILE COMMUNICATION SYSTEM

This is a continuation of PCT/FI98/00818, fled Oct. 20, 1998.

FIELD OF THE INVENTION

The invention relates to a method for directing an antenna beam, the method being used in the transmission direction in a radio system which comprises transceivers forming antenna beams and in which transmitted signals, which propagate via different paths to the transceiver, are received.

BACKGROUND OF THE INVENTION

It is typical to a radio network environment that a signal between a user and a base station does not propagate directly. Depending on the characteristics of the environment, the signal propagates via a plurality of paths of various lengths from the transmitter to the receiver. This kind of multipath propagation takes place, even though the base station and the mobile station were within sight of each other. This multipath propagation is mainly caused by signal reflections and scattering from surfaces in the way of the signal. Signals with different paths, which signals often arrive from different directions at the receiver, generally have different transit time delays, and consequently the signals arrive at the receiver in different phases. If a subscriber terminal, for instance a mobile telephone, is used in a moving vehicle, the reflections of the signal change as a function of time. Moreover, the relative movement of the subscriber terminal causes a change of frequency that equals to the Doppler shift with respect to the nominal frequency of the signal.

Fading occurs, if the multipath components propagating via different paths to the receiver are destructively summed at the receiver. Sometimes a carrier wave transmitted by subscriber terminals propagates fairly directly to a base station. Whereas sometimes the carrier wave reflects from several different surfaces, and consequently the carrier wave propagates to the base station via several different paths. Multipath propagation resulting from carrier wave reflections causes delay spread and angular spread in the signal to be received.

Propagation loss causes weakening in the transmitted signal, and as a consequence, the signals transmitted with the same transmission power arrive differing in strength at the receiver. Various interference signals resulting from signal reflection may be summed to the information signal in the opposite phase, whereby the information signal attenuates more and more. Various obstacles may attenuate the signal the more the further away the transmitter and the receiver are located from one another. If the signal attenuates enough, the connection between the subscriber terminal and the base station may be interrupted or the connection cannot be established in the first place.

In prior art radio systems, a base station forms an antenna beam by means of its antenna. The antenna beam consists of electromagnetic radiation emitted by the antenna. When the subscriber terminal is located in the range of the antenna beam, it is possible, in principle, to establish a connection between the base station and the subscriber terminal. The establishment of a connection is also dependent on the strength of the signal received by the subscriber terminal, for instance.

Sectored base stations are typically used in cellular radio systems.

The cell may be divided into three sectors, for instance. The base station antenna may form an antenna beam that covers the whole sector. For instance, a sector of 120 degrees can be covered by one antenna beam formed by one antenna both in the downlink and uplink directions. Thus, the coverage area needed by the downlink and uplink directions of the sector can be formed by one antenna beam. In the above-mentioned case, the subscriber terminal may be located anywhere in the cell, and nevertheless, it is possible for the subscriber terminal to establish a connection with the base station.

In prior art solutions, in which adaptive antenna arrays are applied, the signal is transmitted downlink with one narrow beam whose direction is estimated from the uplink signal. However, beam forming has been problematic at least in some operational environments. More precisely, problems arise in radio systems where the angular spread of the signal passing through the radio channel becomes large. Radio systems of the above type are, for, instance, urban micro cell systems and indoor pico cell systems.

Those signals that are used for producing radio channels in a radio system and that reflect from several different surfaces on a wide sector have a considerable amount of angular diversity. Angular diversity has been employed in uplink data transmission. The above is based on the fact that the impulse response of the uplink radio channel can be found out by estimation. Instead, the impulse response of the downlink radio channel is not known, if the changing of radio channel is observed only in the short term.

The FDD (Frequency Division Duplex) duplexing method is typically used between the downlink and the uplink, due to which the downlink and uplink radio channels do not correlate in the short term. Due to the FDD duplexing method the direction of the downlink beam, estimated from the uplink signal, may be erroneous. However, the downlink and uplink radio channels correlate, when the radio channel correlation is observed in the long term. In other words, it can be assumed that the uplink and downlink signals propagate via the same reflective surfaces (geometrical reciprocity).

Even though the same scatterers exist between the base station and the subscriber terminal, the signal, estimated by the base station, may be transmitted by a subscriber terminal that is in deep fade seen in the downlink direction. In the above-described problematic situation, the beam formed in the downlink does not necessarily cover the subscriber terminal well enough, and thus the signal was not transmitted in the best possible direction. The probability of problems with the downlink signal transmission increases, when the angular spread of the signal increases.

If the angular spread of the signal that has passed through the transmission channel is smaller than the half-power bandwidth of the base station antenna array, the downlink transmission performs in principle quite as well as the uplink transmission. In one prior art method, problems with the downlink transmission are reduced by using wider beamwidth. However, the use of the above-mentioned method leads to a new problem, i.e. to an increase in the cell size. The increased cell size requires increased transmission power, at least when only one beam is used. Moreover, the increase of transmission power adds to interference in the radio network.

BRIEF DESCRIPTION OF THE INVENTION

The object of the invention is thus to provide a method and a transceiver to the effect that the above-mentioned problems can be solved. This is achieved with a method of the type set forth in the preamble, which method is characterized in that directions of arrival (DoA) of received signals are estimated on receiving the signals that have propagated via different paths, strengths of signals received from different DoAs are measured, and if the DoAs of the received signals differ only slightly from one another, a main antenna beam, which is directed towards the DoA of the strongest signal, is formed in the transmission direction, and if the DoAs of the received signals differ sufficiently from one another, in addition to the main antenna beam, one or more diversity beams are formed in the transmission direction, which are directed towards the DoA of the received signal, wherefrom a signal exceeding the predetermined threshold value is received.

The method of the invention is also characterized in that directions of arrival of received signals are estimated on receiving the signals that have propagated via different paths, strengths of signals received from different DoAs are measured, and the main antenna beam, which is directed towards the DoA of the strongest signal, is formed in the downlink direction of the transceiver, and one or more diversity beams are formed, which are directed towards some other direction than the main antenna beam, and the diversity beam signals are formed in such a way that the subscriber terminal serving as a receiver may differentiate the signals transmitted by different beams.

The invention also relates to a transceiver which comprises antenna arrays forming antenna beams in the transmission direction, by means of which beams a signal is transmitted, and which receives signals that propagate via different paths to the transceiver.

The transceiver in accordance with the invention is characterized by comprising estimating means for estimating DoAs of received signals while the transceiver receives the signals that have propagated via different paths, measuring means for measuring the strengths of signals received from different DoAs, and antenna beam directing means for commanding the antenna array to form in the transmission direction the main antenna beam, which is formed if the DoAs of the received signals differ only slightly from one another in the direction wherefrom the strongest signal is received, and if the DoAs of the received signals differ greatly from one another, the directing means command the antenna array to form, in addition to the main antenna beam, one or more diversity beams which are formed in the direction wherefrom a signal exceeding the predetermined threshold value is received.

The preferred embodiments of the invention are disclosed in the dependent claims.

The invention is based on the fact that angular diversity is employed in downlink transmission, and that the downlink antenna beams are directed on the basis of the received signals.

Several advantages are achieved with the method and the transceiver in accordance with the invention. By means of the method it is possible to direct the antenna beams as optimally as possible, whereby the quality of downlink transmission improves. In practice, this means that the connection signal can be transmitted with a lower transmission power than in earlier methods. If a plurality of beams are formed, the beams are directed in such a way that they do not cause interference to each other. The transceiver in accordance with the invention can be partly implemented as software, and consequently the present transceiver structure does not necessarily change much.

BRIEF DESCRIPTION OF THE DRAWINGS

In the following, the invention will be described in greater detail in connection with preferred embodiments with reference to the accompanying drawings, in which.

DETAILED DESCRIPTION OF THE INVENTION

Figure 1:
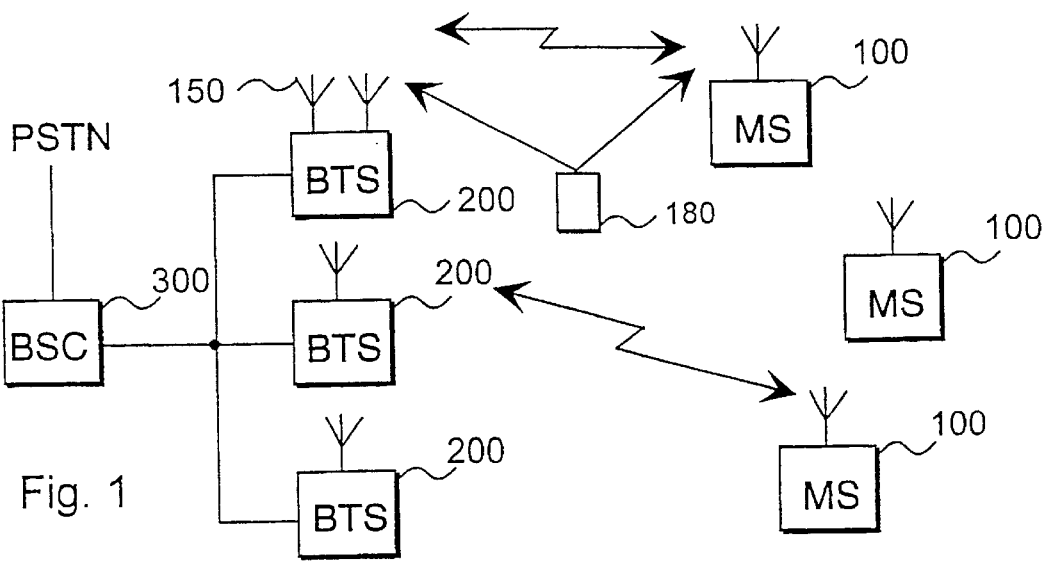
FIG. 1 illustrates a cellular radio system which employs the method of the invention.

FIG. 1 illustrates a cellular radio system which employs the method of the invention. The method of the invention can be applied in FDD and TDD systems. The described cellular radio system comprises a base station controller 300 and a plurality of base stations 200 and subscriber terminals 100. The base station comprises antenna arrays 150 which are used for signal reception and signal transmission. The base station transmits the signal downlink to the subscriber terminal, and the subscriber terminal transmits the signal uplink to the base station. The base station 200 and the subscriber terminal 100 serve as transceivers in the cellular radio system. By means of the transmitted signals the base station 200 and the subscriber terminal 100 establish a connection with each other.

In practice, on the signal propagation path there are always scatterers 180, from which the signal is reflected or scattered, and as a result the propagation direction of the signal changes. A scatterer may be, for instance, a building or some other obstacle. As a consequence of scattering, the signals transmitted by the subscriber terminal 100 propagate via different paths to the base station 200. The signals propagating via different paths typically arrive at the base station at slightly different times. On the basis of the signals that have propagated via different paths, it is possible for the base station 200 to form a signal that is forwarded to other parts of the radio network.

Figure 2:
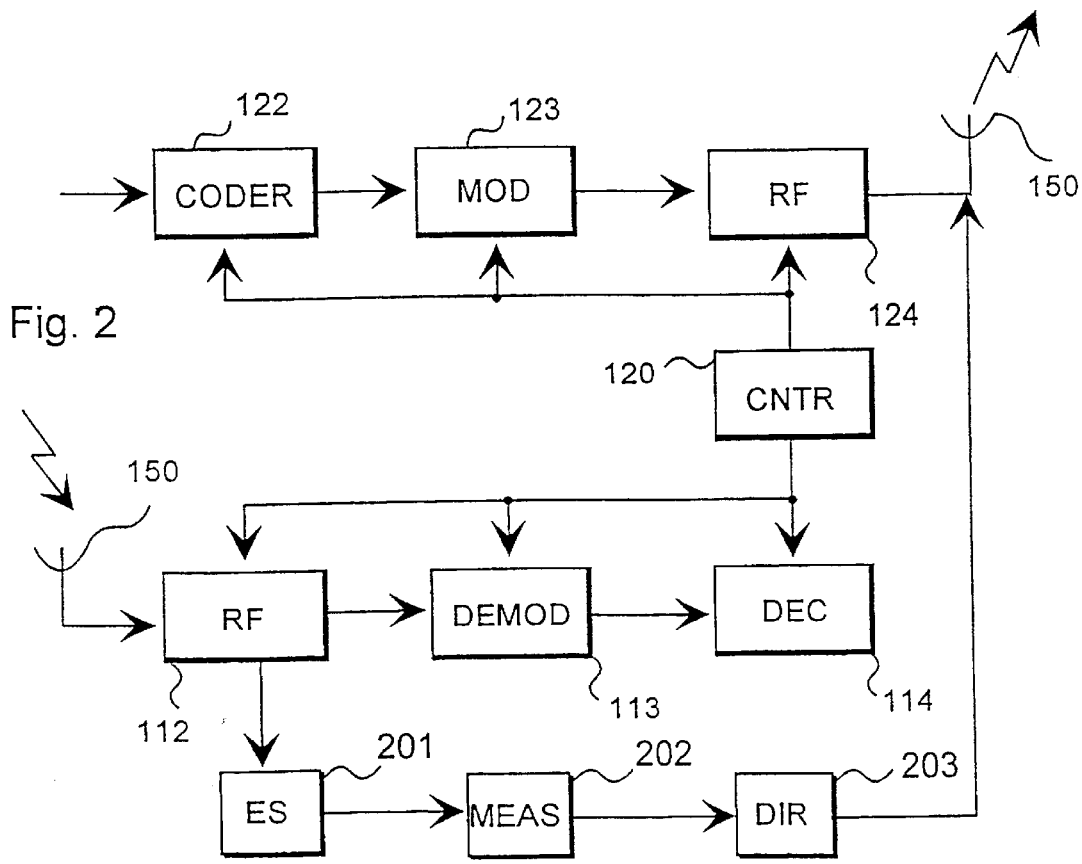
FIG. 2 illustrates in principle the structure of a transceiver of the invention.

FIG. 2 illustrates in principle the structure of a transceiver in accordance with the invention. The transceiver comprises an antenna 150 which serves as a transceiver antenna. The transceiver further comprises radio frequency parts 112, 124, a modulator 123, a demodulator 113 and a control section 120. The transceiver also comprises a coder 122 and a decoder 114. The control section 120 controls the operation of other transceiver sections. The radio frequency parts 112 transfer the radio frequency signal coming from the antenna to an intermediate frequency. The intermediate frequency signal is applied to the demodulator 113 which demodulates the signal. Thereafter, the demodulated signal is decoded in the decoder 114.

The coder 122 receives a signal and sends the coded signal to the modulator 123. In coding, the coder 122 uses e.g. convolutional coding. In addition, the coder 122 performs signal ciphering, for instance. The coder 122 further interleaves the bits or bit groups of the signal. Thereafter, the convolutionally coded signal is applied to the modulator 123, which modulates the signal. Thereafter, the signal is conveyed to the radio frequency parts 124 which convert the modulated signal into radio frequencies. By means of the antenna, the radio frequency parts 124 transmit the signal further to a radio path.

Furthermore, the transceiver comprises estimating means 201, measuring means 202 and means for directing the antenna beam 203. In practice, the estimating means 201, the measuring means 202 and the means for directing the antenna beam 203 are located in the base station 200. The estimating means 201 estimate the directions of arrival of the signals received by the transceiver, when the signals that have propagated via different paths arrive at the transceiver from different directions of arrival. The measuring means 202 measure the strengths of signals received from different DoAs. The means for directing the antenna beam 203 command the antenna arrays to form downlink antenna beams. When preparing commands, the directing means utilize the DoAs of the received signals. In addition, the directing means 203 command the antenna arrays to direct antenna beams in the downlink, whereby the quality of downlink transmission can be improved. In practice, this means that the antenna beams are directed downlink in such a way that the subscriber terminal 100 does not remain in the shadow area.

Figure 3:
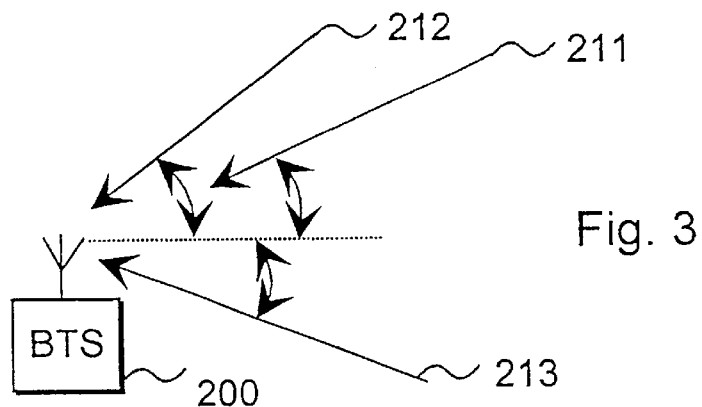
FIG. 3 illustrates signals arriving at the transceiver from various reception directions.

FIG. 3 illustrates signals arriving at the transceiver from different angles of reception. Let us assume that the base station 200 receives signals 211, 212, 213 transmitted by the subscriber terminal 100 that is located in the sector of the cell, which signals propagate via different paths to the base station 200. Let us further assume that the signal 211 is the strongest of the received signals, the signal 212 is the next strongest and the signal 213 is the weakest in intensity. The received signals are applied to the estimating means 101, which estimate the DoA of the signal to be received by means of its partly known components, such as a training sequence or a pilot signal.

Below there is a formula (1), by means of which the directions of arrival of the received signals are determined by using the correlation properties of partly known signals. The directions of arrival can also be estimated by other known methods.

$$P(\theta) = a(\theta)^* H H^* a(\theta), \text{ where} \tag{1}$$

P ($\theta$) is the efficiency of the signal to be received as a function of the azimuth angle, $\theta$ is the azimuth angle of the received signal, a ($\theta$) is the complex steering vector of the antenna array, H is the estimate of the channel impulse response matrix,

* denotes the complex conjugate transpose.

The estimates of the signal DoAs can be improved by averaging the impulse response matrix H over some integration time. The estimating means 101 average DoAs estimated from the received signals by integrating the DoAs over some integration time. Moreover, the estimating means 101 average impulse responses of the received signals. The estimating means 101 average the impulse responses estimated from the received signals in such a way that the estimating means 101 integrate the impulse responses over some integration time.

The optimum integration time generally depends on the variation rate of the radio channel. If the angular spread of the received signals is small, i.e. if the directions of arrival of the received signals differ only slightly from one another, the beam directing means 203 command the antenna or the antenna array 150 to form downlink only the main antenna beam. A formula (2) which the directing means 203 use in determining the angle of direction is presented in the following.

$$DoT = \theta_1, \text{ where } P(\theta_1) = P_{max} \tag{2}$$

As appears clearly from the formula (2), the directing means 203 command that the main antenna beam be formed in the direction, wherefrom the measuring means 202 have measured the strongest signal. In the case of FIG. 3, the above means that if the angular spread of the signals 211, 212, 213 received by the base station 200 is small, the main antenna beam is directed towards the signal 211. In general, the signal that propagates as directly as possible has a relatively high signal power on reception as compared with the signal that propagates via a longer path to the receiver.

If the angular spread of the received signals is wide, i.e. if the directions of arrival of the received signals differ greatly from one another, it is possible for the beam directing means 203 to command the antenna or the antenna array to form, in addition to the main antenna beam, one or more diversity beams in the downlink direction. A formula (3) utilized when deciding on diversity beam forming is presented in the following.

$$P(\theta_2) > P_{threshold} \tag{3}$$

It appears from the formula (3) that, in addition to a suitably wide angular spread, the diversity beam formation requires that the power of the received signal used in diversity beam forming exceed the predetermined power threshold.

As stated above, the main antenna beam and the diversity beam formed by the base station 200 are pointing in different directions. By means of the following formula (4) it is possible to calculate the minimum angular difference required between the main beam and the diversity beam.

$$|\theta_1 - \theta_2| > \Delta\phi \tag{4}$$

It appears from the formula (4) that the absolute value of the difference between the DoA $\theta_2$ of the received signal used in forming the diversity beam and the DoA $\theta_1$ of the received signal used in forming the main beam must be greater than a half-power beamwidth of the antenna array. When the condition of the formula (4) is fulfilled, the main beam and, the diversity beam are sufficiently orthogonal, and thus the signals transmitted in different down-link directions do not correlate. In practice, this means that even though the signal transmitted in the main beam direction were in deep fade, the signal transmitted in the direction of at least one diversity beam is probably sufficiently strong to maintain the good quality of the connection.

If the base station 200 serving as a transceiver receives substantially at the same time signals 211, 212, 213, which are equally strong, the directing means 203 command the antenna array 150 to direct the main beam on the basis of the DoA distribution of the received signals. The main beam can be arranged, for instance, in the direction, wherefrom the transceiver receives the greatest number of strong signals.

Figure 4:
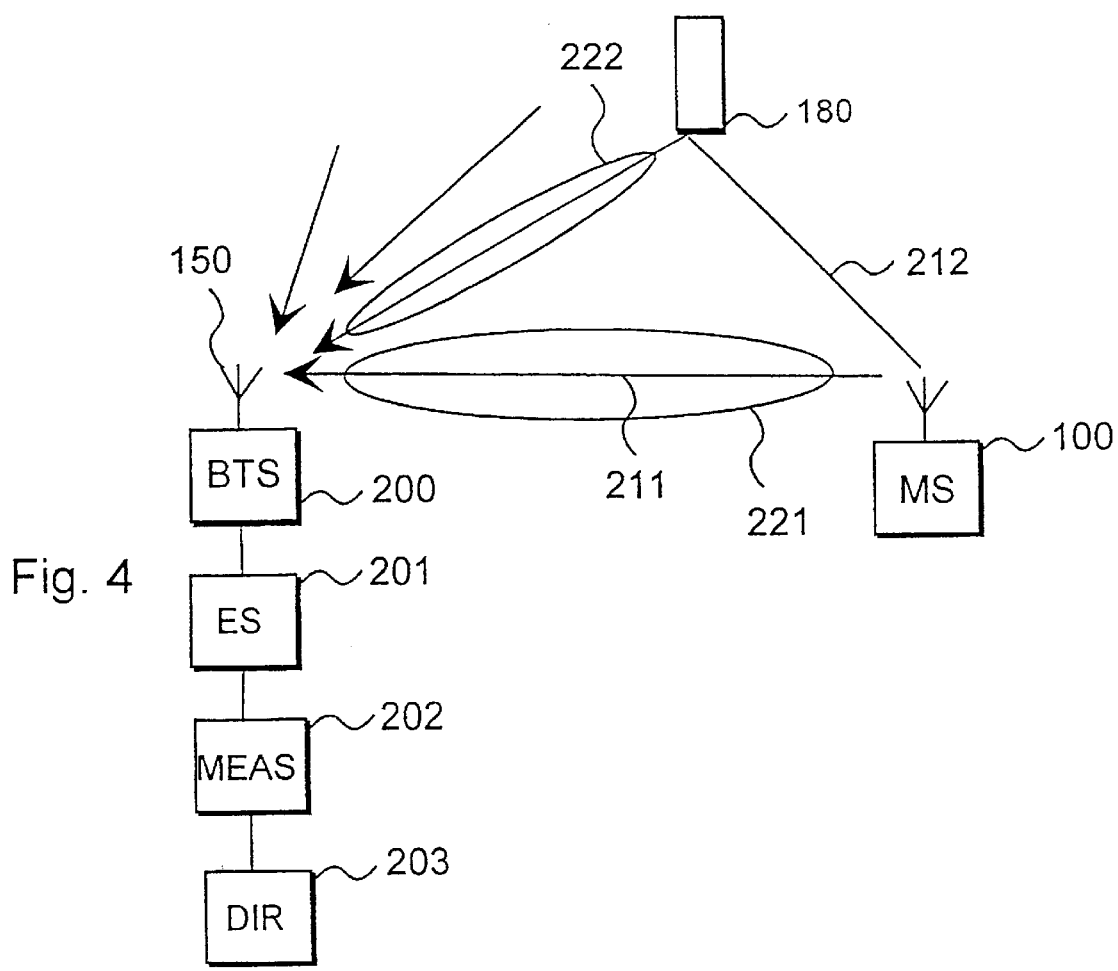
FIG. 4 illustrates antenna beams formed by an antenna array.

FIG. 4 illustrates antenna beams formed by an antenna array. The figure shows that the base station 200 receives a plurality of signals transmitted by the subscriber terminal 100, which signals arrive from different directions at the base station. If the signal 211 arriving at the base station is the strongest of the incoming signals, the antenna array 150 forms a downlink main beam 221 towards the incoming signal 211. If the strength of the signal 212 exceeds a given threshold value, and if the DoAs of the signals 211, 212 differ sufficiently, the antenna array 150 additionally forms a downlink diversity beam 222 in the DoA of the signal 212. The antenna array may form a plurality of diversity beams, if signals exceeding the predetermined threshold value, are received from different directions, and the DoAs of the signals exceeding the threshold value differ sufficiently from one another.

Figure 5:
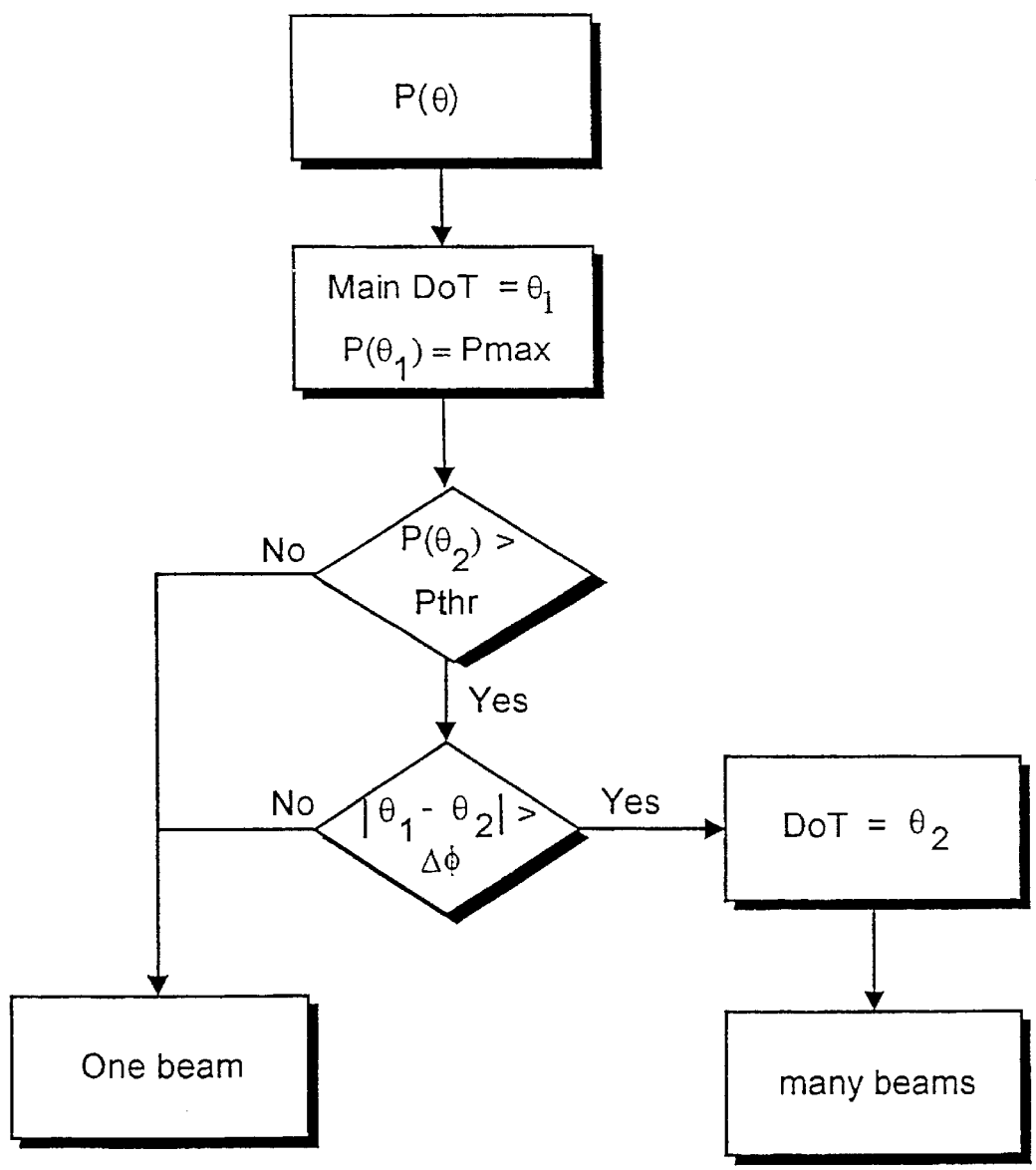
FIG. 5 is a flow chart of antenna beam forming.

FIG. 5 is a flow chart illustrating the formation of antenna beams. The figure shows that the main beam is formed in the direction of the strongest received signal. Thereafter, the decision is made on the formation of a diversity beam in such a way that signals, received from other directions than the strongest signal, are compared with the predetermined threshold value. If no signal exceeding the threshold value is received from any other direction, only the main beam is formed. Whereas, if a signal exceeding the threshold value is received from some direction, it is calculated whether the DoA of the reception signal used in forming the main beam differs sufficiently from the DoA of the signal exceeding the threshold value. If the DoAs are sufficiently different, at least one diversity beam is formed. For instance, signal delay difference can be measured from the received signals. The delay difference can be used as one parameter, on the basis of which the antenna beam is directed. If the delay difference is used as one parameter, it is possible for the subscriber terminal to achieve the maximum advantage of multipath diversity.

Even though the above deals with the invention from the viewpoint of the base station, the invention can also be applied to the subscriber terminal, if the subscriber terminal comprises an antenna array. The invention is particularly well suited for mobile systems which employ e.g. the CDMA method, the TDMA method or the CDMATTDMA hybrid methods. Moreover, the invention is applicable for use in analog and digital networks.

By means of the above-described method base station performance is improved in downlink data transmission. If the delay spread of the channels in the system is very small, the signal delay differences are not considerable. Fading is flat, for instance, in an indoor environment. Moreover, signals received indoors have great angular spread. Transmission of two beams is carried out in a flat-fading environment in such a way that a second of the two beam signals is delayed. A RAKE receiver is typically used in the above-mentioned situation. The method of the invention is applicable e.g. to WCDMA systems which typically use high transmission rates.

In some situations the receiver of the subscriber terminal is not able to resolve or separate the signals of two different beams. In such a case, it is advantageous that the subscriber terminal can separate the received signals in the delay domain. This kind of method is needed for separating the beams of the angular domain at the subscriber terminal. What is achieved with the angular separation of the orthogonal beams is that the beam signals are statistically independent when they are received. This is possible, because signal transmission that is carried out in the delay domain in different beams with different delays guarantees that the receiver can separate the signals having different paths, which enables the exploitation of the angular diversity.

It follows from the above, that there must be a delay between the beam signals which is equal or larger than the temporal resolution of the receiver. In other words, the delay must be at least one chip length in the CDMA system. In the TDMA system the delay must be at least one bit duration.

On the basis of the DoAs of the received signals, the antenna beam, which is directed towards the DoA of the strongest signal, is formed in the transceiver downlink direction. In addition, one or more diversity beams are formed. The signal of each antenna beam is transmitted delayed with a separate delay value. On the basis of the angular spread measured from the uplink direction the diversity beams are directed to point in other directions than the main antenna beam, whereby the subscriber terminal can receive the signals of different beams at different times. Thus the subscriber terminal can differentiate the signals of different beams (i.e. the angular diversity branches).

If desired, the base station may delay the transmission of the main antenna beam or diversity beam signals, and as a consequence the subscriber terminal probably receives the signals at different times. In addition, the base station may quasi-randomly change the phase of the carrier used for transmitting the signals of the second beam, which enhances the diversity. In the CDMA system, the base station may use, for instance, orthogonal codes in the signals of the main beam and/or diversity beams, on the basis of which codes the subscriber terminal can differentiate the signals, transmitted in different beams. The base station may also use so called beam hopping, whereby the base station transmits the signals alternately by means of the main antenna beam and each diversity beam.

Moreover, feedback from the subscriber terminal to the base station can be used in such a manner that the selection and direction of the transmission beams are carried out by the subscriber terminal that receives the beams. The subscriber terminal serving as a receiver can measure the signals received from the beams. On the basis of the measuring, the subscriber terminal sends the base station a message stating in which beam it is preferable to transmit the signal from the base station to the subscriber terminal.

Even though the invention is described in the above with reference to the example in the accompanying drawings, it is obvious that the invention is not restricted thereto, but it can be modified in a variety of ways within the scope of the inventive idea disclosed in the attached claims.

What is claimed is:

1. A method for directing an antenna beam, the method being used in the transmission direction in a radio system which comprises transceivers forming antenna beams and in which transmitted signals, which propagate via different paths to the transceiver, are received, characterized in that directions of arrival of received signals are estimated on receiving the signals that have propagated via different paths, strengths of signals received from different directions of arrival are measured, and if the directions of arrival of the received signals differ only slightly from one another, a main antenna beam, which is directed towards the direction of arrival of the strongest signal, is formed in the transmission direction, and if the directions of arrival of the received signals differ sufficiently from one another, in addition to the main antenna beam, one or more diversity beams are formed in the transmission direction, which are directed towards the direction of arrival of the received signal, wherefrom a signal exceeding the predetermined threshold value is received.

2. A method as claimed in claim 1, characterized in that the diversity beam is formed if the direction of the main beam and the direction of the diversity beam to be formed differ from one another at least for a half-power beamwidth of the beam forming antenna array.

3. A method as claimed in claim 1, characterized in that the main beam is directed on the basis of the distribution of the directions of arrival of the received signals when receiving equally strong signals.

4. A method as claimed in claim 1, characterized in that the main beam is arranged in the direction, wherefrom the greatest number of strong signals is received.

5. A method as claimed in claim 1, characterized in that each diversity beam is directed on the basis of the distribution of the directions of arrival of the received signals when receiving several signals whose power exceeds a predetermined threshold value of the signal.

6. A method as claimed in claim 1, characterized in that impulse responses are estimated from the received signals, and the impulse responses are averaged by integrating them over some integration time.

7. A method as claimed in claim 1, characterized in that azimuth angles estimated from the received signals are averaged by integrating them over some integration time.

8. A method as claimed in claim 1, characterized in that the strength of the received signal is calculated as a function of the direction of arrival of the signal from the received signal power, in the calculation of which the impulse response of the received signal is used.

9. A method as claimed in claim 1, characterized in that the strength of the received signal is calculated as a function of the direction of arrival of the signal from the received signal impulse response, which is formed by utilizing previously known signal components of the received signal, a pilot signal or a training sequence.

10. A method as claimed in claim 1, characterized in that the main beam and each diversity beam are directed to be mutually orthogonal.

11. A method for directing an antenna beam, the method being used in the transmission direction in a radio system which comprises transceivers forming antenna beams and in which transmitted signals, which propagate via different paths to the transceiver, are received, characterized in that
    directions of arrival of received signals are estimated on receiving the signals that have propagated via different paths,
    strengths of signals received from different directions of arrival are measured,
    and the main antenna beam, which is directed towards the direction of arrival of the strongest signal, is formed in the downlink direction of the transceiver, and one or more diversity beams are formed, which are directed towards some other direction than the main antenna beam, and
    the diversity beam signals are formed in such a way that the subscriber terminal serving as a transceiver may differentiate the signals transmitted by different beams.

12. A method as claimed in claim 2, characterized in that in the method, the transmission of the main beam and one or more diversity beams is delayed in relation to one another.

13. A method as claimed in claim 2, characterized in that the phase of the carrier used for transmitting the signals of one or more beams is quasi-randomly changed.

14. A method as claimed in claim 2, characterized in that codes are used in the signals of the main antenna beam or one or more diversity beams, on the basis of which codes the signals transmitted in different beams can be separated from one another at the subscriber terminal.

15. A method as claimed in claim 2, characterized in that the signals of the main antenna beam and one or more diversity beams are transmitted alternately in different beams of the transceiver.

16. A method as claimed in claim 2, characterized in that signals received by the subscriber terminal serving as a receiver are measured and the measuring results are transmitted to the base station, on the basis of which information the beams to be transmitted to the subscriber terminal are selected.

17. A method as claimed in claim 2, characterized in that the main antenna beam and one or more diversity beams are formed, if the delays of the received signals differ from one another.

18. A transceiver, which comprises antenna arrays (150) forming antenna beams in the transmission direction, by means of which beams a signal is transmitted, and which receives signals that propagate via different paths to the transceiver, characterized in that the transceiver comprises
    estimating means (101) for estimating the directions of arrival of the received signals when the transceiver receives signals that have propagated via different paths,
    measuring means (102) for measuring the strengths of the signals received from different directions of arrival, and
    beam directing means (103) for commanding the antenna array (150) to form in the transmission direction the main antenna beam, which is formed if the directions of arrival of the received signals differ only slightly in the direction, wherefrom the strongest signal is received,
    and if the directions of arrival of the received signals differ greatly from one another the directing means (103) command the antenna array (150) to form, in addition to the main antenna beam, one or more diversity beams, which are formed in the direction, wherefrom a signal exceeding the predetermined threshold value is received.

19. A transceiver as claimed in claim 18, characterized in that the directing means (103) command the antenna array (150) to form a diversity beam, if the direction of the formed main antenna beam and the direction of the diversity beam to be formed differ from one another at least for a half-power beamwidth of the antenna array (150).

20. A transceiver as claimed in claim 18, characterized in that the directing means (103) command the antenna array (150) to direct the main beam on the basis of the distribution of the directions of arrival of the received signals, if the transceiver receives several equally strong signals.

21. A transceiver as claimed in claim 18, characterized in that the directing means (103) command the antenna array (150) to direct the main beam in the direction, wherefrom the transceiver receives the greatest number of strong signals, when the transceiver receives several equally strong signals.

22. A transceiver as claimed in claim 18, characterized in that the directing means (103) command the antenna array (150) to direct the diversity beam on the basis of the distribution of the directions of arrival of the received signals, if the transceiver receives several signals whose power exceeds the predetermined threshold value.

23. A transceiver as claimed in claim 18, characterized in that the measuring means (102) calculate the strength of the received signal as a function of the direction of arrival of the received signal from the power of the received signal.

24. A transceiver as claimed in claim 18, characterized in that the estimating means (101) estimate impulse responses from the received signals, and the estimating means (101) average the impulse responses by integrating them over some integration time.

25. A transceiver as claimed in claim 18, characterized in that the estimating means (101) average the azimuth angles estimated from the received signals by integrating them over some integration time.

26. A transceiver as claimed in claim 18, characterized in that the measuring means (102) calculate the strength of the received signal from the impulse response of the signal received by the transceiver.

27. A transceiver as claimed in claim 18, characterized in that the directing means (103) command the antenna array (150) to direct the main beam and each diversity beam in such a way that the beams are mutually orthogonal.

* * * * *